United States Patent [19]
Tosaka et al.

[11] Patent Number: 5,270,757
[45] Date of Patent: Dec. 14, 1993

[54] TOGGLE-OPERATED, SELF-CONTAINED CAMERA FLASH UNIT

[75] Inventors: Yoichi Tosaka; Jun Terashima, both of Yokohama, Japan

[73] Assignee: Canon Kabushiki Kaisha, Tokyo, Japan

[21] Appl. No.: 34,645

[22] Filed: Mar. 22, 1993

Related U.S. Application Data

[63] Continuation of Ser. No. 734,602, Jul. 23, 1991, abandoned.

[30] Foreign Application Priority Data

Jul. 25, 1990 [JP] Japan ................... 2-196488

[51] Int. Cl.⁵ .............................................. G03B 15/03
[52] U.S. Cl. .............................................. 354/149.11
[58] Field of Search ................................... 354/149.11

[56] References Cited

U.S. PATENT DOCUMENTS 4,688,913 8/1987 Whiteside et al. ............. 354/149.11
4,910,542 3/1990 Yamamoto et al. ............ 354/149.11

FOREIGN PATENT DOCUMENTS 62-127534 8/1987 Japan .

Primary Examiner—Michael L. Gellner
Assistant Examiner—Howard B. Blankenship
Attorney, Agent, or Firm—Fitzpatrick, Cella, Harper & Scinto

[57] ABSTRACT

A camera includes a camera body, a flash unit which is movable between a first position where it is accommodated in the camera body and a second position where it is protruding from the camera body, and a toggle mechanism designed to change a direction of a biasing force between the camera body and the flash unit in response to the movement of the flash unit relative to the camera body.

16 Claims, 6 Drawing Sheets

TOGGLE-OPERATED, SELF-CONTAINED CAMERA FLASH UNIT

This application is a continuation of application Ser. No. 07/734,602 filed Jul. 23, 1991, now abandoned.

BACKGROUND OF THE INVENTION

1. Field of the Invention

The present invention relates to a camera with a self-contained flash unit.

2. Description of the Related Art

Conventional camera mechanisms for positioning a self-contained flash unit at stored and popped-up positions and for moving the flash unit between these two positions comprise a combination of a spring and a clamping device. Such positioning and moving mechanisms are disclosed in, for example, Japanese Utility Model Laid-Open No. 127534/1987. FIGS. 3 (a) and 3 (b) respectively show the above-described conventional mechanism in the states where the flash unit is disposed in stored and popped-up positions. In FIGS. 3 (a) and 3 (b), reference numeral 1 denotes a camera body shown in outline. Although the camera body 1 practically comprises a cover member that determines the external appearance of the camera body, only the outline thereof is shown in FIGS. 3 (a) and 3 (b) to simplify the illustration. Reference numeral 2 denotes a flash unit which is movable between the stored and popped-up positions. The flash unit 2 includes a housing 3 which is rotatably supported by a fixed shaft 4, and is fixed to the camera body 1, a xenon tube 5 provides a flash light, a reflector 6 supports the xenon tube 5 and reflects the flash light of the xenon tube 5 toward an object located in front of the camera, a transparent panel 7 transmits the flash light, and is fixed to the housing 3 for supporting the reflector 6, and a torsion coil spring 8 is mounted on the fixed shaft 4. One end of the spring 8 is hooked onto the fixed shaft 4 while the other end thereof is hooked onto a protrusion 3e of the housing 3. The spring 8 biases the housing 3 in a clockwise direction. A fan-shaped hole 3a, centered on the fixed shaft 4, is formed in the housing 3. A protrusion 9, formed integrally with the camera body 1, is fitted into the hole 3a. A protrusion 3d, which will be described in detail later, is provided in the housing 3 for locking the casing at its stored position.

A clamping lever 10 is rotatably supported on the camera body 1 by a pin 10a. The clamping lever 10 has, at one end, a claw portion 10b which engages the protrusion 3d of the housing 3 and at the other end an extending portion 10c which engages an operation button 11 protruding from the camera body 1. The clamping lever 10 is biased by a spring (not shown) in a counterclockwise direction.

Consequently, in the state shown in FIG. 3 (a), the claw portion 10b engages the protrusion 3d of the housing 3 and thus holds the housing 3 at the position shown in FIG. 3 (a) against the bias force of the spring 8 while the extending portion 10c pushes up the operation button 11.

When the camera user desires to take pictures using the flash unit, he or she depresses the operation button 11. Depressing the operation button 11 rotates the clamping lever 10 clockwise against the spring (not shown), and thereby disengages the claw portion 10b from the protrusion 3d of the housing 3. Consequently, the housing 3 rotates clockwise about the fixed shaft 4 due to the bias force of the spring 8 until one end portion 3b of the fan-shaped hole 3a of the housing 3 comes into contact with the protrusion 9 and then stops, thereby providing the state shown in FIG. 3 (b). At that time, a switch (not shown) generates a signal which begins the preparation for a picture taking operation using the flash unit, e.g., initiating the charging of the flash unit capacitor (not shown).

When the camera user manually rotates the flash unit 2 counterclockwise against the bias force of the spring 8 from the state shown in FIG. 3 (b), the claw portion 10b of the clamping lever 10 once again comes into engagement with the protrusion 3d of the housing 3, and is returned to the state shown in FIG. 3 (a).

However, the above-described conventional mechanism which uses a clamping lever to hold the flash unit at the stored state has the following drawbacks.

To ensure that the claw portion 10b of the clamping lever 10 reliably engages the protrusion 3d of the housing 3, the flash unit 2 must be rotated slightly further counterclockwise from the state shown in FIG. 3 (a). This further rotation is necessary to compensate for dimensional tolerances present in the clamping mechanism, and is achieved by providing a gap "X" between the flash unit 2 and the camera body 1, as shown in FIG. 3 (a). However, if the gap "X" is large, spring backlash will be present which allows the flash unit 2 to move when it is pressed, which deteriorates the quality and finish of the camera.

Since the claw portion 10b of the clamping lever 10 is located between the camera body 1 and the flash unit 2, the width of the camera body 1 is increased as viewed, for example, from the left in FIG. 3, which increases the overall size of the camera.

Furthermore, the switch is generally changed over synchronously with the movement of the flash unit 2 to its popped-up position to generate a change-over signal which begins the preparation for a picture taking operation using the flash unit 2. Naturally, the biasing force of the spring 8 gradually weakens as the number of times the flash unit 2 moves to its popped-up position increases.

Therefore, the biasing force of the spring 8 must be strong enough to change over the switch and to bias the flash unit 2 to its popped-up position.

However, to increase the spring bias force, it is necessary to increase the diameter of the spring wire and/or the number of burns of the spring 8, which increases the size of the spring 8. This, in turn, increases the overall size of the camera, and requires a larger amount of operating force to be applied to the operation button 11 to disengage the clamping lever 10.

SUMMARY OF THE INVENTION

An object of the present invention is to provide a camera with a self-contained flash unit which is capable of eliminating spring backlash and which is small in size.

To achieve this, the present invention in one aspect provides a camera with a self-contained flash unit which is movable between its stored and popped-up positions by means of a toggle mechanism.

The invention in one aspect pertains to a camera comprising a camera body, a flash unit which is movable between a first position where it is stored in the camera body and a second position where it is popped-up from the camera body, and a toggle mechanism adapted to change a direction of a bias force between the flash unit and the camera body in response to the movement of the flash unit relative to the camera body.

The invention in another aspect pertains to a flash, device for a camera having a camera body, comprising a flash unit which is movable between a first position where it is stored in the camera body and a second position where it is popped-up from the camera body, and a toggle mechanism adapted to change a direction of a bias force between the flash unit and the camera body in response to the movement of the flash unit relative to the camera body.

The invention in a further aspect pertains to a camera comprising a camera body, a flash unit which is movable between a first position where it is stored in the camera body and a second position where it is popped-up from the camera body, a driving mechanism for driving the flash unit from the first position to the second position and from the second position to the first position, and a toggle mechanism adapted to change a direction of a bias force between the flash unit and the camera body in response to the movement of the flash unit relative to the camera body.

DETAILED DESCRIPTION OF THE PREFERRED EMBODIMENTS

Figure 1A:
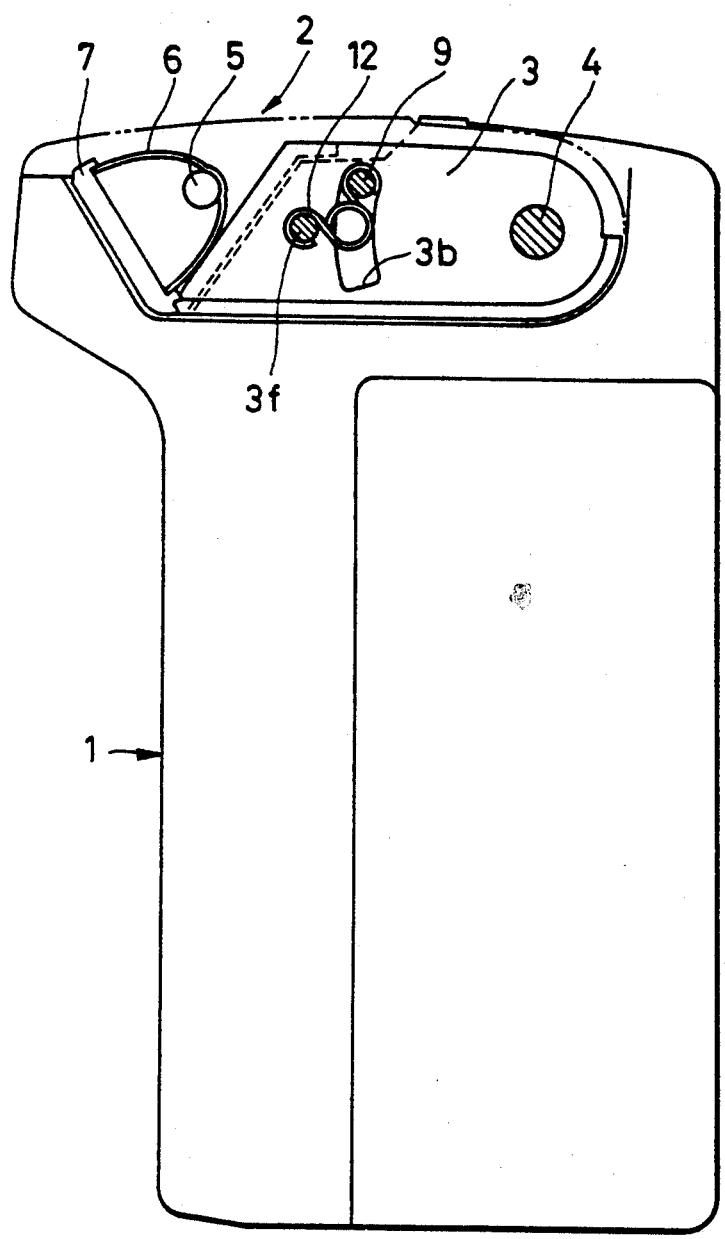
FIGS. 1 (a) and 1 (b) are schematic cross-sectional views of a first embodiment of a camera according to the present invention.
Figure 1B:
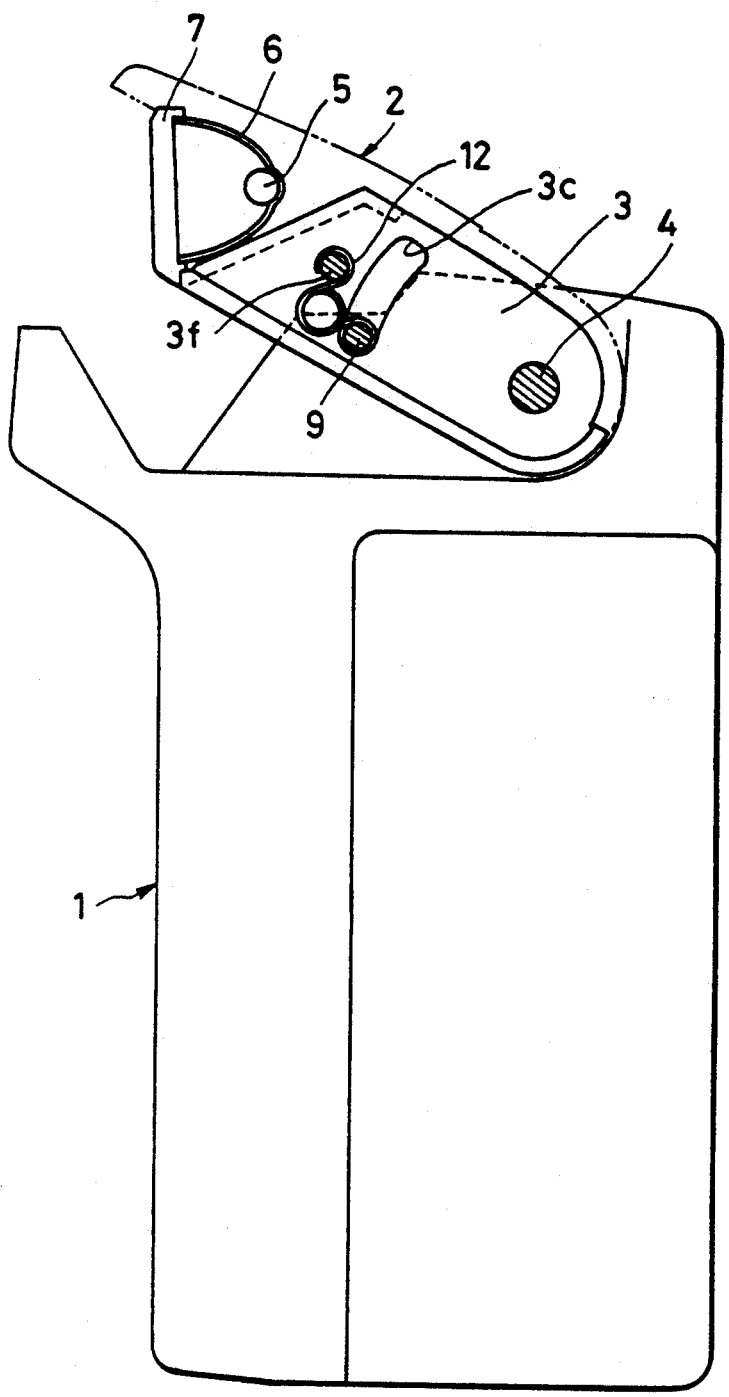
Figure 3A:
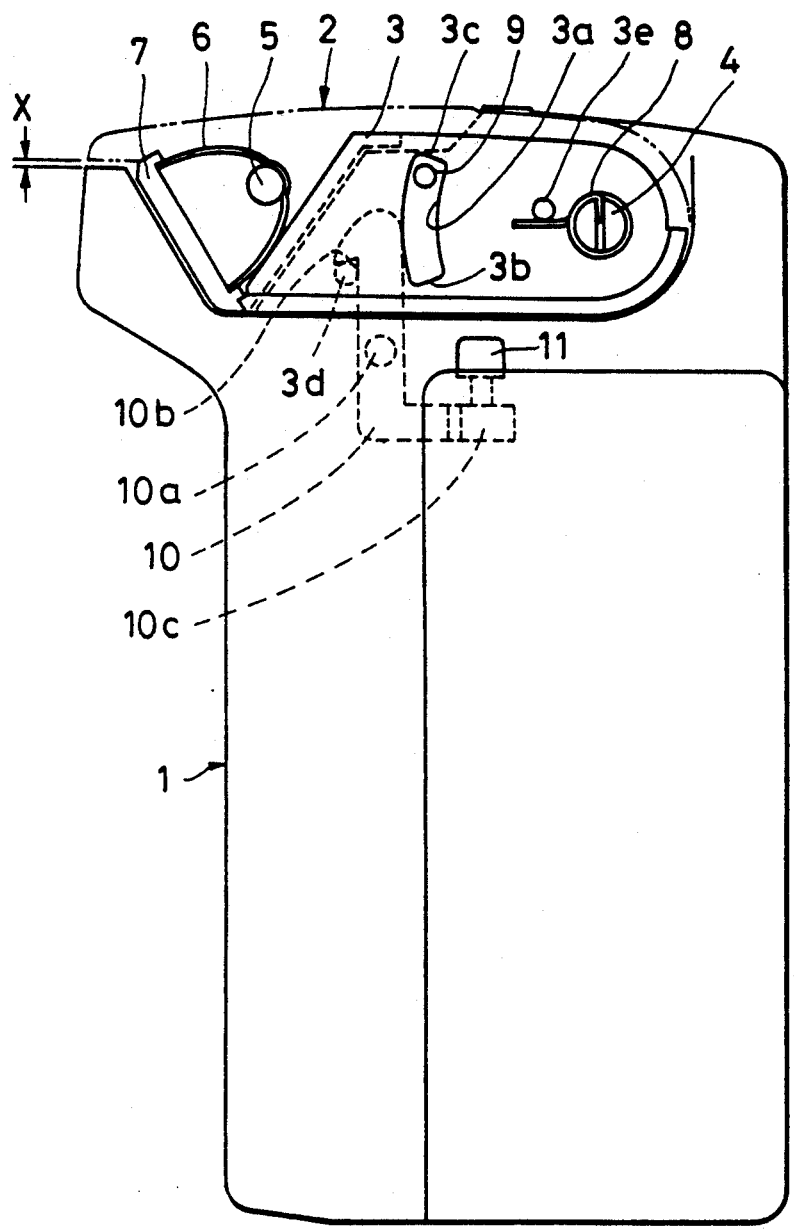
FIGS. 3 (a) and 3 (b) are schematic cross-sectional views of a conventional camera.
Figure 3B:
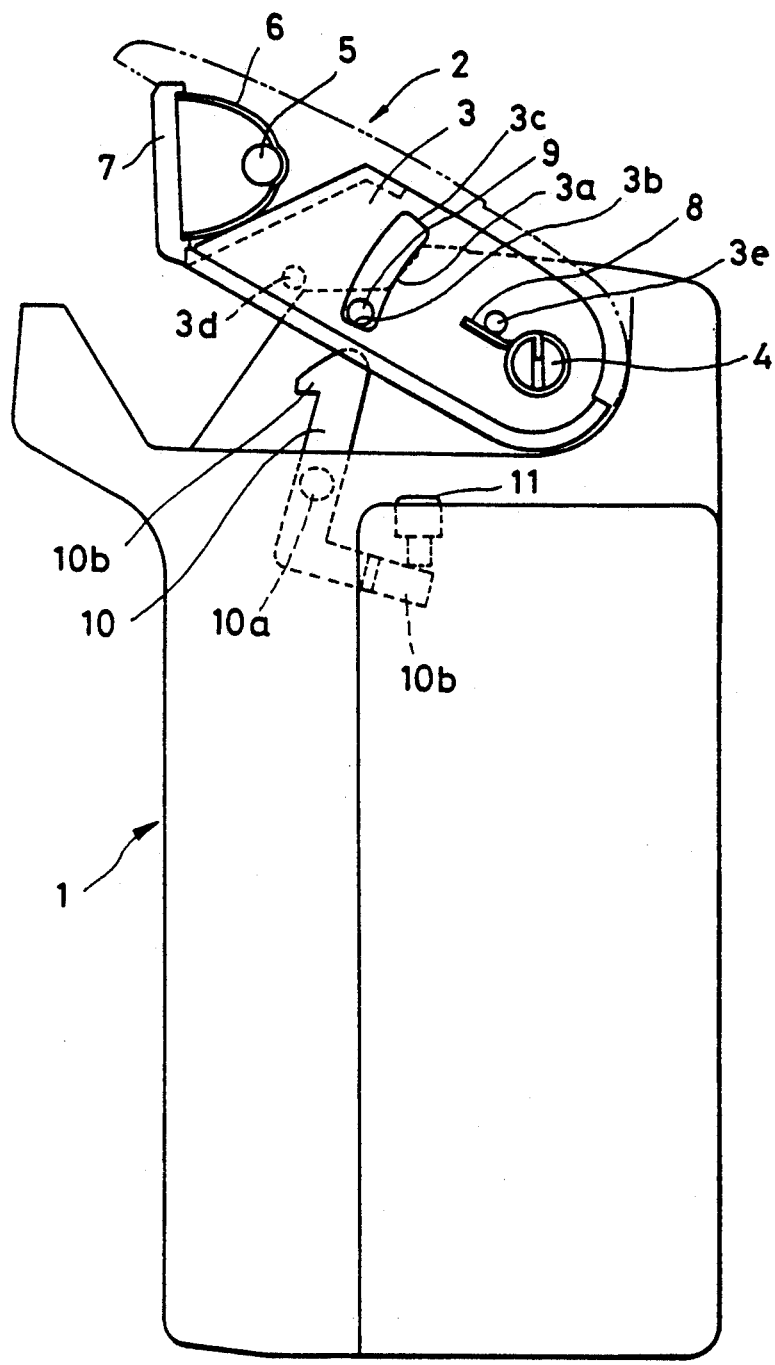

FIGS. 1 (a) and 1 (b) are schematic views of a first embodiment of the camera according to the present invention in a state in which the flash unit 2 is stored and popped-up, respectively. In FIGS. 1 (a) and 1 (b), the same reference numerals are used to denote components which are the same as those shown in FIGS. 3 (a) and 3 (b), and the description thereof has been omitted. Arm portions of a torsion coil spring 12 are hooked onto a protrusion 9 of the camera body 1 and onto a protrusion 3f of the housing 3. In this state, the spring 12 urges the protrusions 9 and 3f in directions in which they are separated from each other. In the state shown in FIG. 1 (a), the protrusion 3f of the housing 3 is pressed substantially downward by the spring 12.

Therefore, the moment of bias force about the fixed shaft 4 of the housing 3 that provides counterclockwise rotation is generated. However, the flash unit 2 is in abutment with the camera body 1 and is therefore stably held at the stored position.

When the camera user manually rotates the flash unit 2 clockwise against the bias force of the spring 12 to take pictures using the flash unit 2, the protrusion 3f of the housing 3 moves from below and to the left of the protrusion 9 to the left thereof, and the direction of the bias force applied by the spring 12 changes from the downward direction to the leftward direction. Consequently, the moment of the bias force about the fixed shaft 4 that produces counterclockwise rotation is reduced.

When the direction of the bias force applied to the protrusion 3f of the housing 3 by the spring 12 coincides with the line connecting the center of the fixed shaft 4 to the protrusion 3f, the moment of the bias force about the fixed shaft 4 of the housing 3 is reduced to zero. This state is called the null or dead point of the toggle mechanism.

When the camera user further manually rotates the flash unit 2 clockwise, the moment of the bias force that produces clockwise rotation is generated at the fixed shaft 4. In this state, even if the camera user releases the flash unit 2, the flash unit 2 continues rotating clockwise until one end 3b of the fan-shaped hole 3a comes into contact with the protrusion 9 of the body 1. At that time, the moment of the bias force which produces the clockwise rotation increases as the operation of the flash unit 2 proceeds. In the state shown in FIG. 1 (b), a substantially upward bias force is applied to the protrusion 3f of the housing 3 by the spring 12. Therefore, the moment of the bias force that produces a clockwise rotation is generated at the fixed shaft 4, and the flash unit 2 is stably held in its popped-up position.

To accommodate the flash unit 2, the camera user manually rotates the flash unit 2 counterclockwise against the bias force of the spring 12. At this time, the moment of the bias force about the fixed shaft 4, generated by the spring 12, acts in the opposite direction, i.e., the bias force first reduces to zero, and then changes to the counterclockwise direction, thereby providing the stored state shown in FIG. 1 (a).

In this embodiment, the flash unit 2 can be held at its stored position without spring backlash. The components required in the conventional mechanism, such as the clamping device or the operation button, are unnecessary, and production costs can thus be decreased.

Since the spring 12 is accommodated between the flash unit 2 and the camera body 1, the size of the flash unit 2 is small compared with the conventional mechanism which uses the clamping device.

Figure 2A:
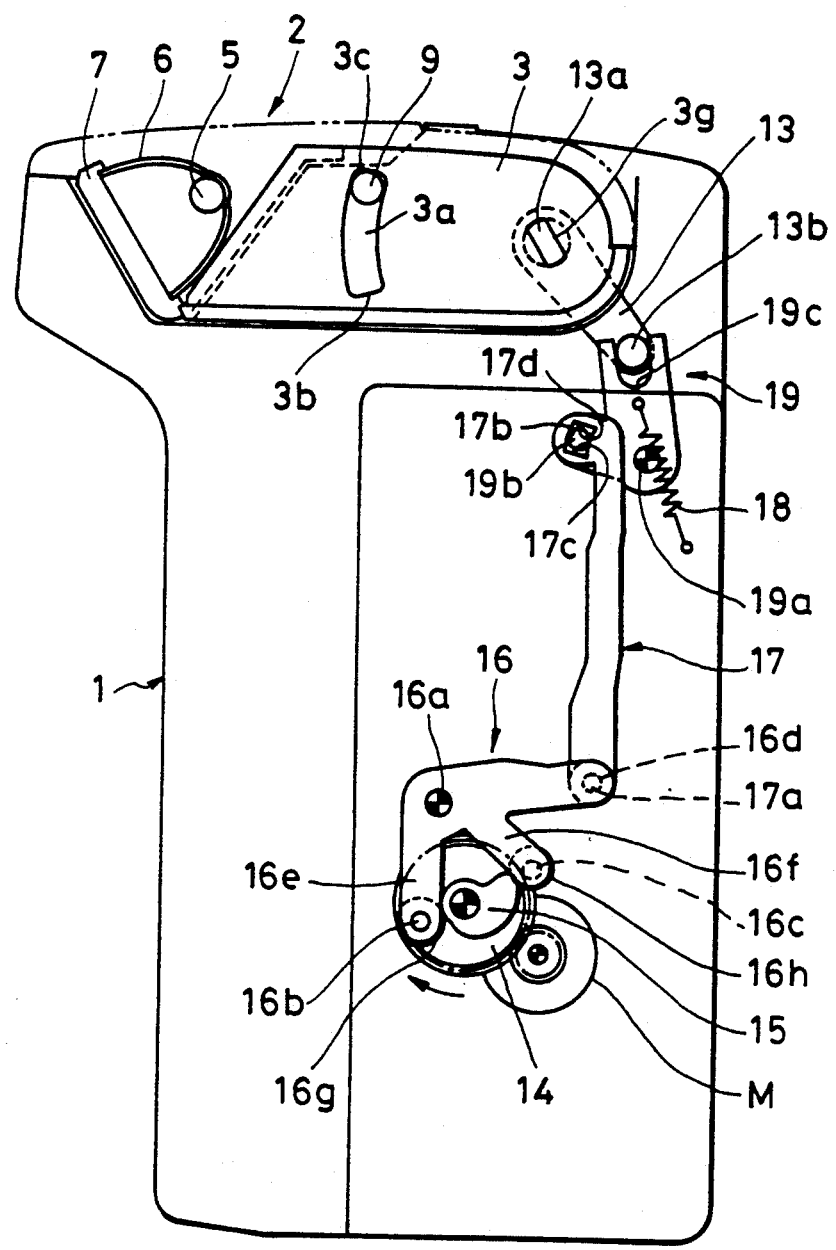
FIGS. 2 (a) and 2 (b) are schematic cross-sectional views of a second embodiment of a camera according to the present invention.
Figure 2B:
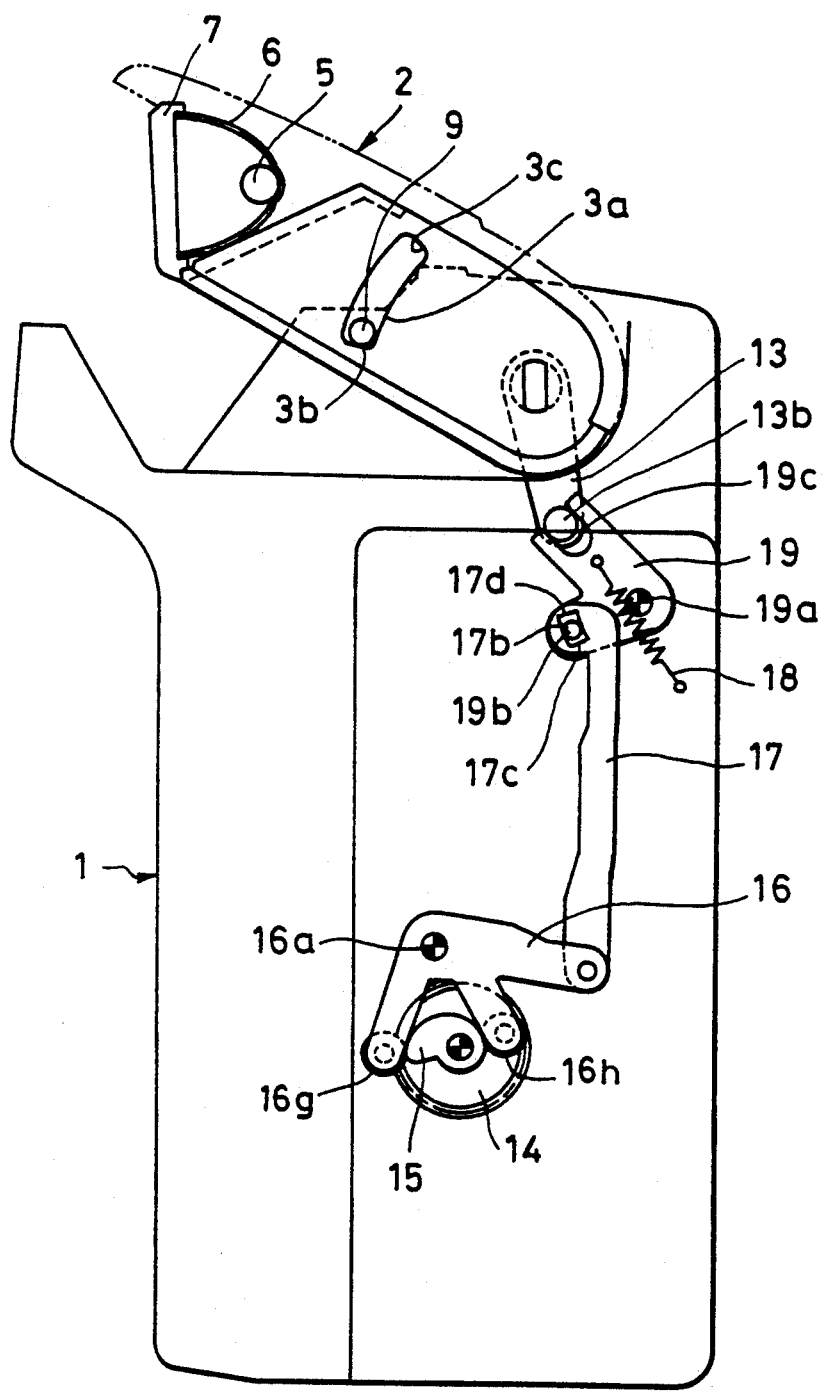

FIGS. 2 (a) and 2 (b) show a second embodiment of the present invention, are respectively in the stored and popped-up states. In this embodiment, a motor incorporated in the camera body 1 is used as the driving force to store and pop-up the flash unit 2.

A rectangular hole 3g is provided at the center of the rotation of the housing 3 of the flash unit 2, and a rectangular portion of a shaft 13a of a lever 13 is fitted into the hole 3g. Since the shaft 13a of the lever 13 is rotatably supported by the camera body 1, the flash unit 2 and the lever 13 can be rotated together about the shaft 13a. The lever 13 has, at its distal end, an engaging shaft 13b which engages, without any spring backlash, a U-shaped groove 19c of a lever 19 which will be described later.

A gear 14 is connected to a motor M through a reduction gear, and is rotatable together with a cam 15. A lever 16 is rotatable about a shaft 16a. The lever 16 has a pair of arms 16e and 16f which are located on the two sides of the cam 15. Rollers 16g and 16h are respectively supported by the distal ends of the arms 16e and 16f in such a manner that they are in contact with the cam 15 and that they are rotatable about shafts 16b and 16c.

In the state shown in FIG. 2 (a), the roller 16h is in contact with the top portion of the cam 15, and the lever 16 is located at the most counterclockwise position in the driven range of the cam 15.

A hole 16d is formed in the other end of the lever 16, and a shaft 17a of a lever 17 is rotatably supported by the hole 16d.

A fan-shaped hole 17b which is substantially centered on a shaft 19a, which is the center of rotation of the lever 19, is provided in the other end of the lever 17, and a shaft 19b, provided on the lever 19, is fitted into the fan-shaped hole 17b in such a manner that no spring backlash exits with respect to the inner and outer peripheral arcs of the fan-shaped hole 17b and that a gap exists with respect to edges 17c and 17d of the hole 17b. A tension spring 18 is provided to urge the lever 19 clockwise in the state shown in FIG. 2 (a). However, the U-shaped groove 19c of the lever 19 is in engagement with the shaft 13b of the lever 13, and the lever 13 and the flash unit 2 are thus in the stored state. Therefore, the lever 13 and the flash unit 2 cannot further rotate counterclockwise and are held in the state shown in FIG. 2 (a).

The operation for moving the flash unit 2 to its popped-up position now will be described. When the motor M is operated and the gear 14 is thereby rotated clockwise, the roller 16h supported by the lever 16 is first disengaged from the top portion of the cam 15, and then the roller 16g contacts the lifting portion of the cam 15. As the cam 15 rotates clockwise, the lever 16 also rotates clockwise, and the lever 17 thereby starts moving downward as viewed in FIG. 2 (b). At that time, the levers 19 and 13 and the flash unit 2 are held stably in the stored state until the shaft 19b of the lever 19 contacts the edge 17d of the fan-shaped hole 17b of the lever 17. After the shaft 19b contacts the edge 17d of the fan-shaped hole 17b, the lever 19 rotates counterclockwise against the bias force of the spring 18, and the lever 13 and the flash unit 2 thereby starts a clockwise rotation.

As the lever 19 rotates counterclockwise, the center line of the spring 18 comes closer to the center of the rotation of the lever 19, and the bias force of the spring 18 which urges the flash unit 2 counterclockwise is thus weakened. After the bias force of the spring 18 is reduced to zero, the spring urges the lever 19 counterclockwise.

The motor M stops when a detection means (not shown) detects that the roller 16g has risen on the top portion of the cam 15, thereby providing the flash unit in a popped-up state shown in FIG. 2 (b). The position of the levers 16 and 17 is determined by the action of the cam 15, and the position of the flash unit 2 and that of the levers 13 and 19 are determined by the biasing force of the spring 18 and the contacting position of the one end portion 3b of the fan-shaped hole 3a of the housing 3 with the fixed protrusion 9 of the camera body 1. The edges 17c and 17d of the fan-shaped hole 17b of the lever 17 are not in contact with the shaft 19b of the lever 19.

In this embodiment, since the toggle mechanism is accommodated in the camera body, the size of the flash unit 2 can be minimized. Furthermore, when the flash unit 2 is located at its stored and popped-up positions, some play is provided between the levers 17 and 19. Therefore, mechanical errors can be absorbed, and a fine stroke adjustment is not necessary.

As will be understood from the foregoing description, in the present invention, the flash unit is held at its stored and popped-up positions by means of a toggle mechanism. Consequently, a gap or spring backlash between the flash unit and the camera body can be eliminated so as to improve the appearance of the camera, and to reduce the size of the camera.

While the present invention has been described with respect to what presently are considered to be the preferred embodiments, it is to be understood that the invention is not limited to the disclosed embodiments. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. A camera comprising:
    a camera body;
    a flash unit which is movable between a first position where it is stored in said camera body and a second position where it is popped-up from said camera body; and
    a toggle mechanism adapted to change a direction of a bias force acting on said flash unit between a first direction, in which said flash unit is biased toward the popped-up position, and a second direction, in which said flash unit is biased toward the stored position, in response to the movement of said flash unit relative to said camera body.

2. The camera according to claim 1, wherein said toggle mechanism comprises a spring which urges said flash unit first toward the first position and then toward the second position when said flash unit moves from the first position to the second position and which urges said flash unit first toward the second position and then toward the first position when said flash unit moves from the second position to the first position.

3. The camera according to claim 2, wherein a first end of said spring is supported by said camera body, and a second end thereof is supported by said flash unit, the direction of the bias force of said spring being changed over through a null point during the movement of said flash unit.

4. The camera according to claim 2, wherein said spring comprises a coil spring.

5. The camera according to claim 3, wherein said spring comprises a coil spring.

6. A flash device for a camera having a camera body, comprising:
    a flash unit which is movable between a first position where it is stored in said camera body and a second position where it is popped-up from said camera body; and
    a toggle mechanism adapted to change a direction of a bias force acting on said flash unit between a first direction, in which said flash unit is biased toward the popped-up position, and a second direction, in which said flash unit is biased toward the stored position, in response to the movement of said flash unit relative to said camera body.

7. The flash device according to claim 6, wherein said toggle mechanism comprises a spring which first urges said flash unit toward the first position and then toward the second position when said flash unit moves from the first position to the second position and which first urges said flash unit toward the second position and then toward the first position when said flash unit moves from the second position to the first position.

8. The flash device according to claim 7, wherein a first end of said spring is supported by said camera body, and a second end of said spring is supported by said flash unit, the direction of the bias force of said spring being changed through a null point during the movement of said flash unit.

9. The flash device according to claim 7, wherein said spring comprises a coil spring.

10. The flash device according to claim 8, wherein said spring comprises a coil spring.

11. A camera, comprising:
   a camera body;
   a flash unit which is movable between a first position where it is stored in said camera body and a second position where it is popped-up from said camera body;
   a driving mechanism for driving said flash unit from the first position to the second position and from the second position to the first position; and
   a toggle mechanism adapted to change a direction of a bias force acting on said flash unit between a first direction, in which said flash unit is biased toward the popped-up position, and a second direction, in which said flash unit is biased toward the stored position, in response to the movement of said flash unit relative to said camera body.

12. The camera according to claim 11, wherein said driving mechanism comprises a drive source which drives said flash unit located in an upper portion of said camera body using a rotational force of said drive source.

13. The camera according to claim 12, wherein said drive source comprises a rotatable cam, and a lever which pivots in response to the rotation of said cam.

14. The camera according to claim 11, wherein said toggle mechanism comprises a spring which first urges said flash unit toward the first position and then toward the second position when said flash unit moves from the first position to the second position and which first urges said flash unit toward the second position and then toward the first position when said flash unit moves from the second position to the first position.

15. The camera according to claim 14, wherein said driving mechanism comprises a rotatable cam, and a lever which pivots in response to the rotation of said cam, and wherein said spring changes its bias force direction relative to said lever.

16. The camera according to claim 15, wherein a first end of said spring is supported by said camera body, and a second end of said spring is supported by said lever, the direction of the bias force of said spring being changed through a null point during the movement of said flash unit.

* * * * *